United States Patent [19]

Dunfield et al.

[11] Patent Number: 5,698,911
[45] Date of Patent: Dec. 16, 1997

[54] LOW LEAKAGE ACTUATOR FOR HIGH PERFORMANCE

[75] Inventors: John C. Dunfield, Santa Cruz; Kamran Oveyssi, Aptos, both of Calif.

[73] Assignee: Seagate Technology, Inc., Scotts Valley, Calif.

[21] Appl. No.: 443,432

[22] Filed: May 17, 1995

[51] Int. Cl.$^6$ .............................. H02K 41/02; G11B 33/00
[52] U.S. Cl. ............................................. 310/12; 360/106
[58] Field of Search .............................. 310/12, 13, 14, 310/193; 360/104, 105, 106

[56] References Cited

U.S. PATENT DOCUMENTS

| | | |
|---|---|---|
| 5,313,124 | 5/1994 | Macpherson ........................ 310/13 |
| 5,396,338 | 3/1995 | Brown ................................. 360/106 |

*Primary Examiner*—Steven L. Stephan
*Assistant Examiner*—Judson H. Jones
*Attorney, Agent, or Firm*—Flehr Hohbach Test Albritton & Herbert LLP

[57] ABSTRACT

An actuator, suited for rapidly and precisely locating the head of a disc drive, reduces variations in flux density and reluctance torque across the entire effective stroke width of the actuator. The actuator, cooperating with a voice coil motor, includes a central yoke, upper and lower yokes aligned above and below the central yoke, and side yokes all formed of magnetic permeable material, a coil movable over the central yoke, and magnets supported from the upper and lower yokes and aligned with the stroke width of the coil. The upper and lower yoke pieces are profiled to have an increased radius in the region near the ends of these yokes and near the end of the coil stroke arc. This maximizes the flux density passing through these yokes so that the flux density and torque applied to the actuator is made linear. The simple structure improves performance without any substantial increase in the design envelope and operates at high efficiency. Alternative configurations provide for portions of the central pole piece beyond the end of the stroke of the coil to become gradually wider or thicker so that the flux flow around the corners where the central pole piece meets the side pieces of the yoke does not saturate and reduce torque at the actuator, and a variation where the magnets are shaped in the vertical axis perpendicular to the plane of motion of the coil in order to promote the flux passage or distribution through the yoke.

13 Claims, 10 Drawing Sheets

LOW LEAKAGE ACTUATOR FOR HIGH PERFORMANCE

FIELD OF THE INVENTION

The present invention relates to an actuator, and more particularly to an actuator for precise and high speed movement. The actuator design herein is especially suitable for seeking systems for rapidly and precisely locating the recording/reproducing head of a hard disc drive, optomagnetic recording apparatus, or the like.

BACKGROUND OF THE INVENTION

The magnetic transducer in a magnetic disc drive, or the optical head of an optical or magnetic optical disc drive, is supported typically from an actuator to move radially across the disc to seek information on tracks recorded on the disc. To make the head track move from track to track quickly and precisely, a motor or actuator having a quick response, constant control function, a linear flex density and substantially linear torque across the entire effective stroke of the actuator is highly desirable.

FIGS. 1, 2 and 3 illustrate simple and typical voice coil motors for use in forming an actuator to position a head. The voice coil motor comprises a yoke member 10 forming magnetic paths, and unipolar permanent magnets 20 and 20' mounted on the respective upper and lower portions 12 and 12' of the yoke member 10, defining air gaps G on both sides of central portion 11 of the yoke member 10. A moving coil 30 is wound slidably around the central portion 11 of yoke member 10. When current flows through moving coil 30, electromagnetic thrust works in a direction perpendicular to those of the current and the magnetic flux of permanent magnets 20 and 20'. In response, moving coil 30 moves along central portion 11 of yoke member 10 due to the thrust. The magnetic flux paths created by permanent magnets 20 and 20' are shown in FIG. 2 and the magnetic flux paths established by moving coil 30 are shown in FIG. 3. In other words, magnetic flux $fm_1$ and $fm_2$ generated from permanent magnet 20 or magnetic flux $fm_3$ and $fm_4$ generated from permanent magnet 20' are horizontally separated into left and right fields and flow in opposing directions within yoke member 10. Magnetic flux $fc_1$ and $fc_2$ generated by current flowing through moving coil 30 are vertically divided into upper and lower fields and each flux flows in a certain direction according to the direction of its current. Magnetic flux $fm_1$ to $fm_4$ of the permanent magnets constantly flow but magnetic flux $fc_1$ and $fc_2$ of moving coil 30 have varied strength and direction according to current. Thus, the density of the whole magnetic flux distributed within the yoke member varies by the movement of the moving coil. This brings out the variation of density of air gap's magnetic flux distributed in air gaps 6 between the central portion 11 of the yoke member 10 and each of the permanent magnets 20 and 20', in effect causing a problem by deterioration of the control function. These characteristics of maintaining a substantially constant torque over the width of the stroke by maintaining substantially constant flux density over the whole stroke are illustrated in FIGS. 4 and 4B. As noted, the target is to cause the sides of the coil, which are the effective parts of the coil interacting with the magnet, to always see a substantially constant flux density as the coil moves through the gap.

A number of patents have been issued to deal with this problem, none of which have been successful in linearizing the flux density cooperating with the coil across the width of the stroke, especially in meeting performance demands for the ever-smaller disc drives being adopted in the industry where the space provided for the voice coil motor in all of the X Y and Z axes is limited. Among the prior art approaches is found U.S. Pat. No. 5,177,383 which discusses both a shorted turn concept around the edge of the center yoke, and a shorted turn around the full width of the center yoke, neither of which is successful in overcoming the problems discussed above. U.S. Pat. No. 4,652,779 shows a shorted turn wrapped around the center of the center yoke as well as the use of copper to form part of the center pole. U.S. Pat. No. 4,250,416 shows a hollow yoke structure which does not provide sufficient tailoring of the flux density and in fact reduces the available flux density. U.S. Pat. No. 4,945,330 shows a radial design with moving coil and laminations, and profiling in the radial direction of the stationary magnet and yoke. This is a space consuming approach, utilizing space which is not available in small disc drives or disc drives with large discs. U.S. Pat. No. 3,816,777 shows a linear motor with pole piece profiling in the same direction as the field direction in the magnet, an option which is not available in current disc drives with their existing limitations on space and height.

Further problems which follow from prior art designs include the fact that using shorted turns, the air gap must be widened to account for the thickness of the shorted turn, decreasing the density of the air gaps magnetic flux, and increasing the overall height of the actuator. The other approaches require permanent magnets of high efficiency, or a substantial increase in the current applied to the moving coil, both of which are undesirable because of the rise in the products' cost and other practical limitations imposed by the need for long life.

SUMMARY OF THE INVENTION

Therefore, it is an objective of the present invention to provide a voice coil motor or actuator having improved performance without a substantial increase in the design envelope.

A further object of the present invention is to eliminate the above mentioned problems and provide an actuator having a simple structure yielding a high efficiency but economical in power consumption.

It is a further objective of the present invention to provide an actuator capable of effecting smooth operation and rapid positioning of the actuator across its entire effective stroke width by minimizing variations in flux density and thereby in reluctance torque.

A related objective of the invention is to provide an actuator which is suitable for precise high speed movement of a transducer or the like in response to commands.

To accomplish these and other objects of the present invention, there is provided a actuator cooperating with a voice coil motor comprising a central yoke, upper and lower yokes aligned above and below the central yoke, and side yokes all formed of magnetic permeable material, and a coil movable over the central yoke, and magnets supported from the upper and lower yokes and aligned with the stroke width of the coil, the upper and lower yoke pieces being profiled to incorporate an increased radius in the region near the ends of these yoke pieces and typically near the end of the coil stroke arc. This maximizes the flux density passing through these yokes so that the flux density and torque applied to the actuator is made linear.

In an alternative embodiment, the portions of the central pole piece beyond the end of the stroke of the coil become gradually wider or thicker so that the flux flow around the corners where the central pole piece meets the side pieces of the yoke does not saturate, causing a loss of flux density, reducing torque at the actuator.

In a further alternative, the magnets themselves may be shaped in the vertical axis perpendicular to the plane of motion of the coil in order to promote the flux passage or distribution through the yoke.

Other features and advantages of the present invention will become apparent from the following detailed description of the preferred embodiments given with reference to the following drawings.

DETAILED DESCRIPTION OF THE PREFERRED EMBODIMENTS

Figure 1:
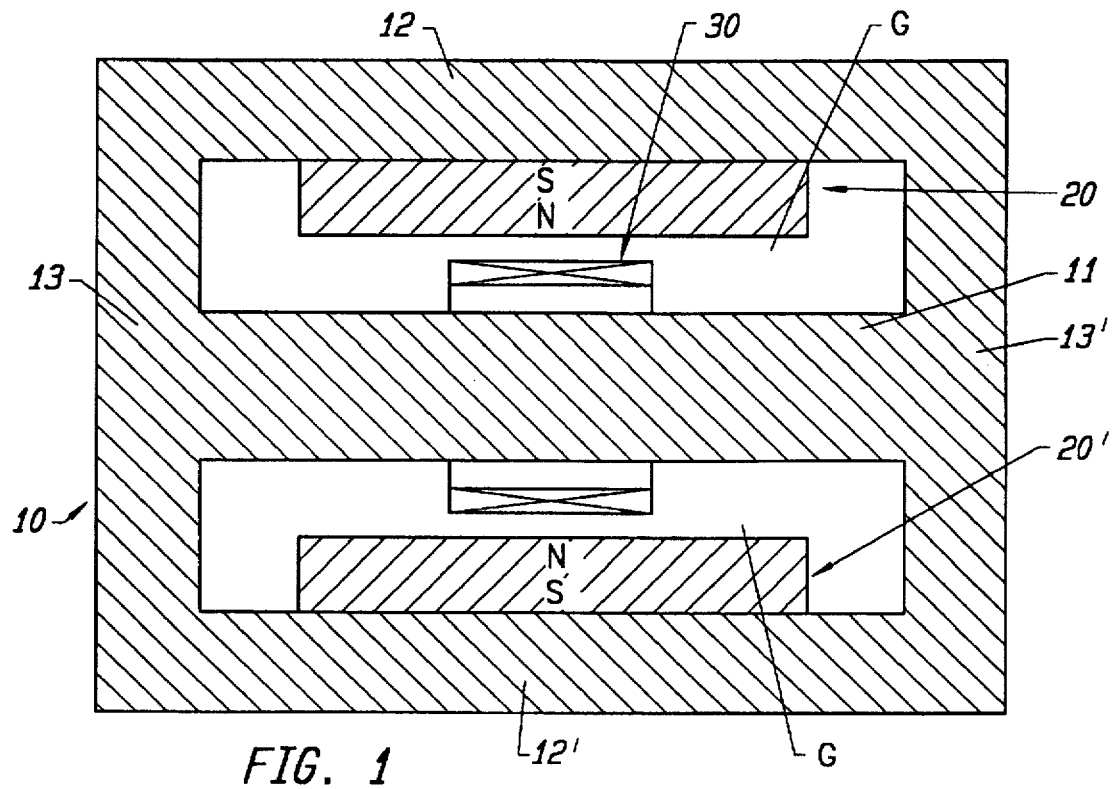
FIG. 1 illustrates a prior art actuator.
Figure 2:
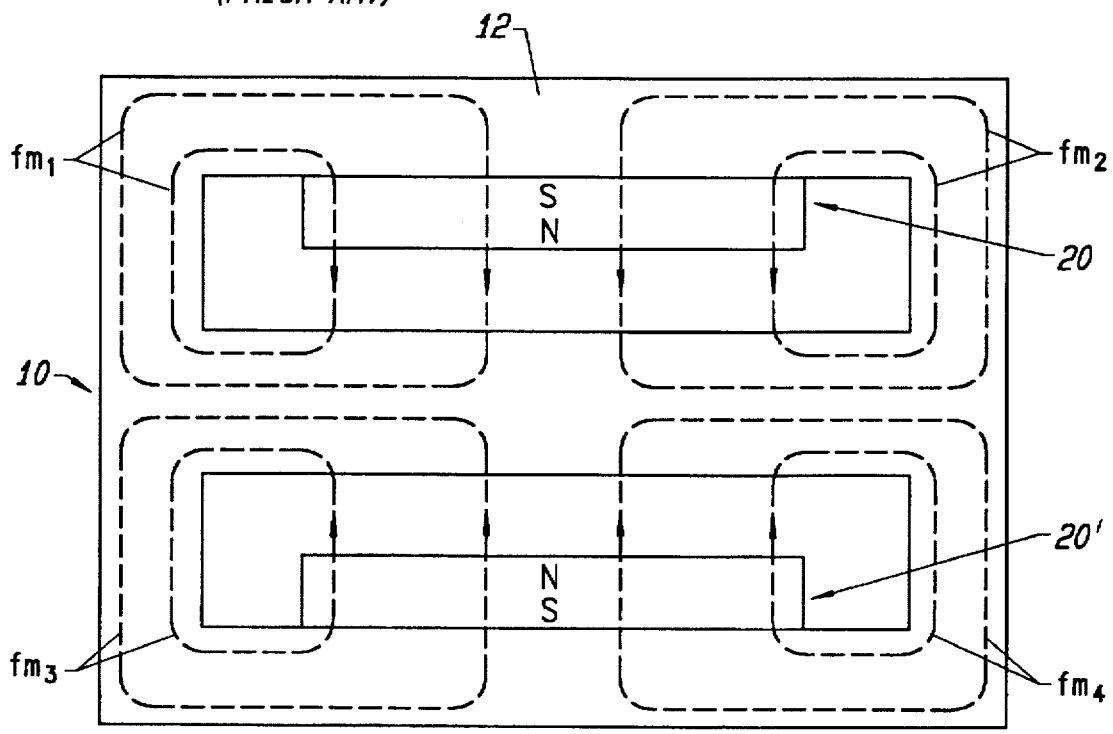
FIGS. 2 and 3 illustrate the magnetic flux flowing in the actuator of FIG. 1.
Figure 3:
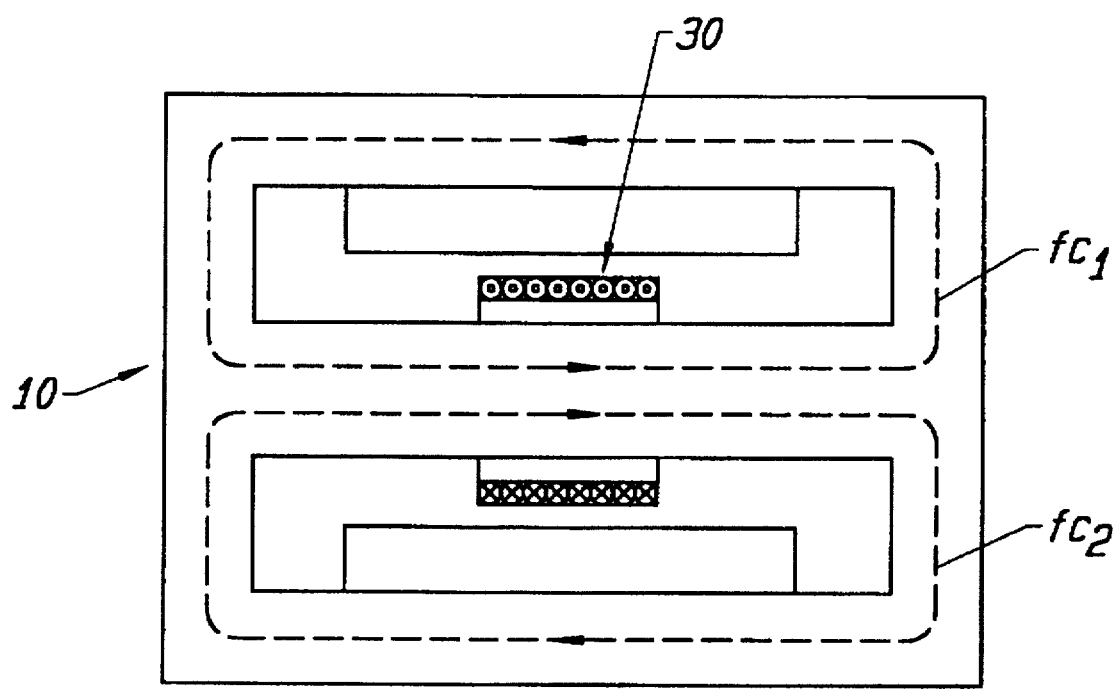
Figure 4:
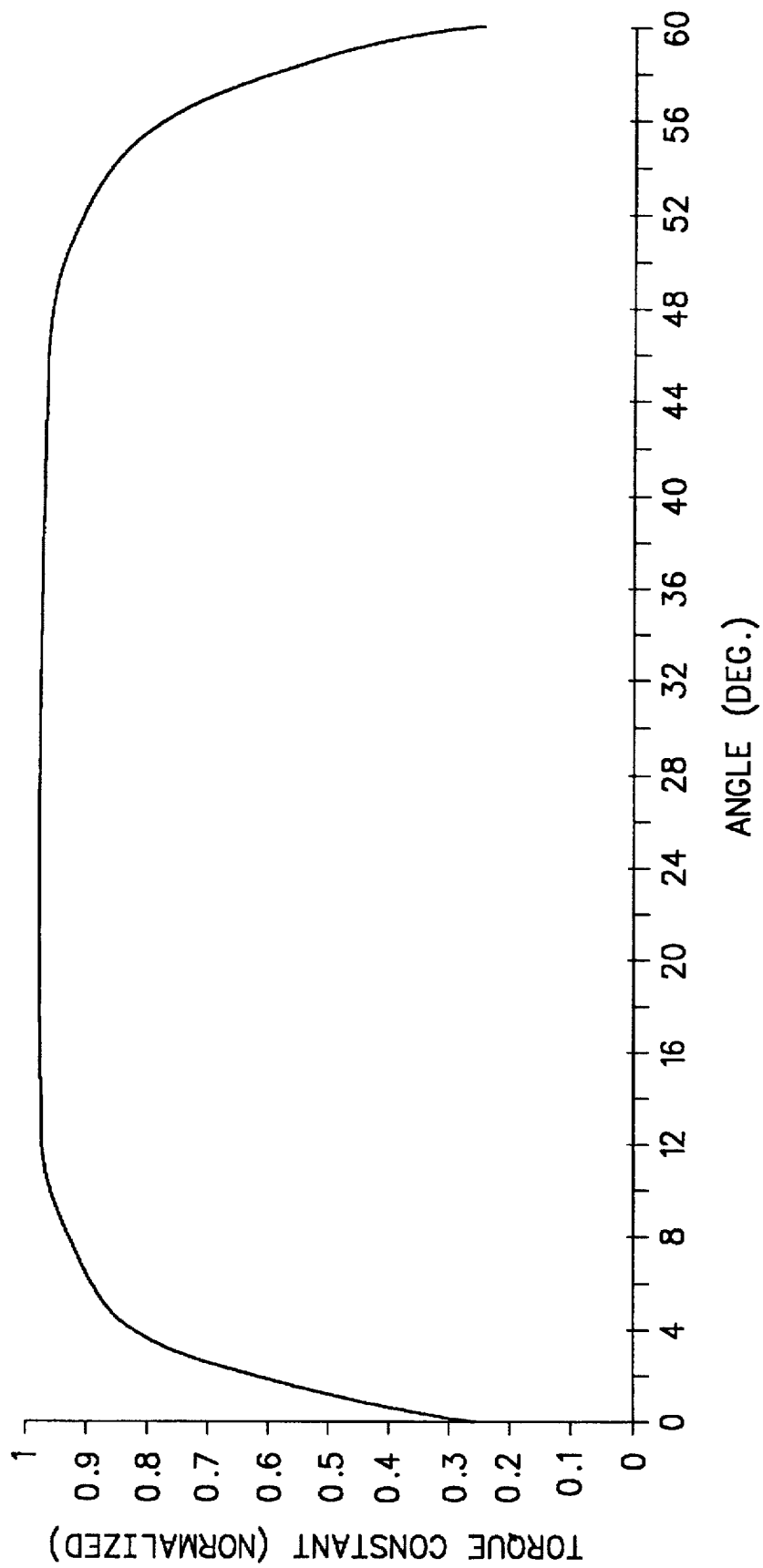
FIG. 4 is a graph of torque constant vs. angle characteristic in a rectangular yoke voice coil motor.
Figure 5:
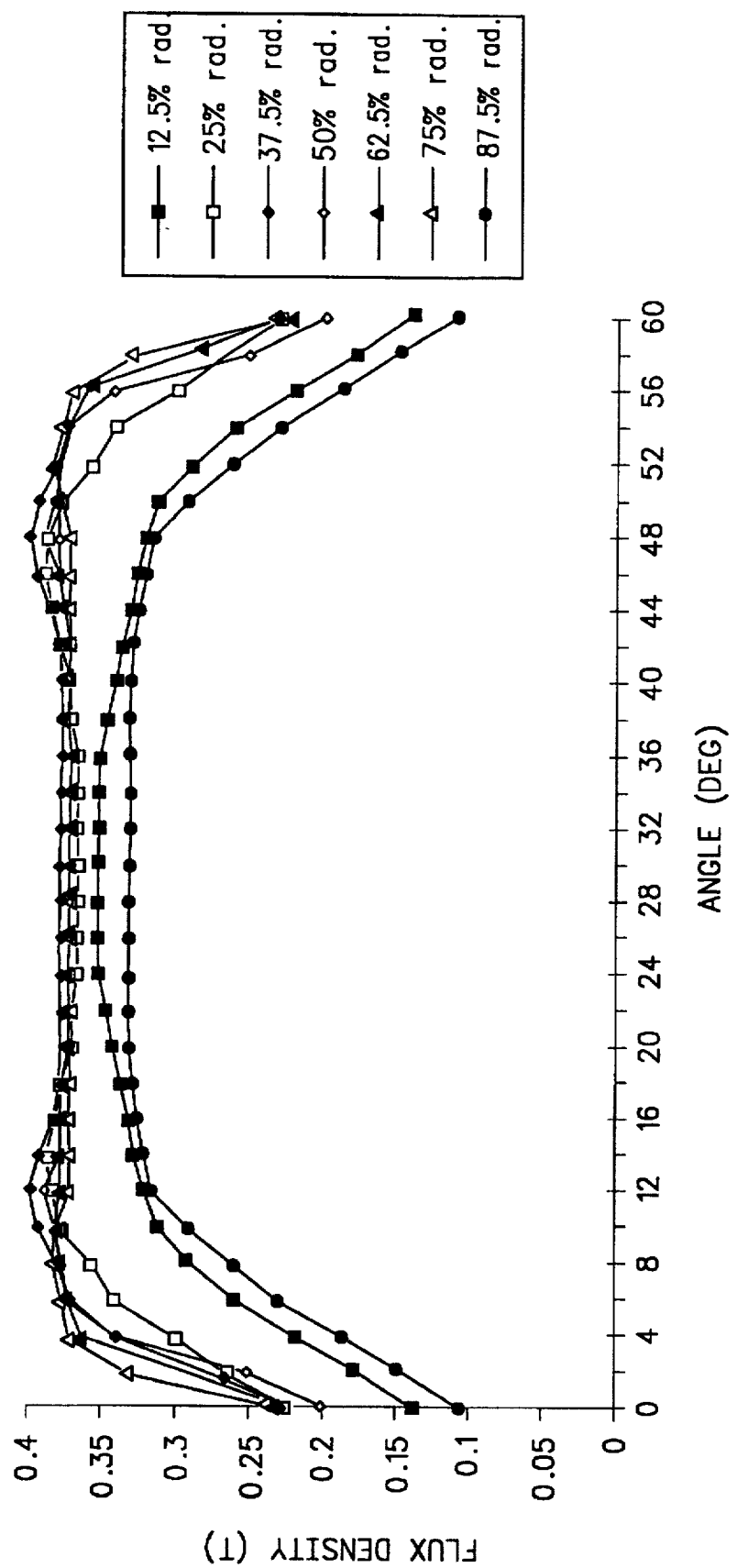
FIG. 5 is a graph of axial flux density vs. angle in a rectangular yoke voice coil motor.
Figure 6:
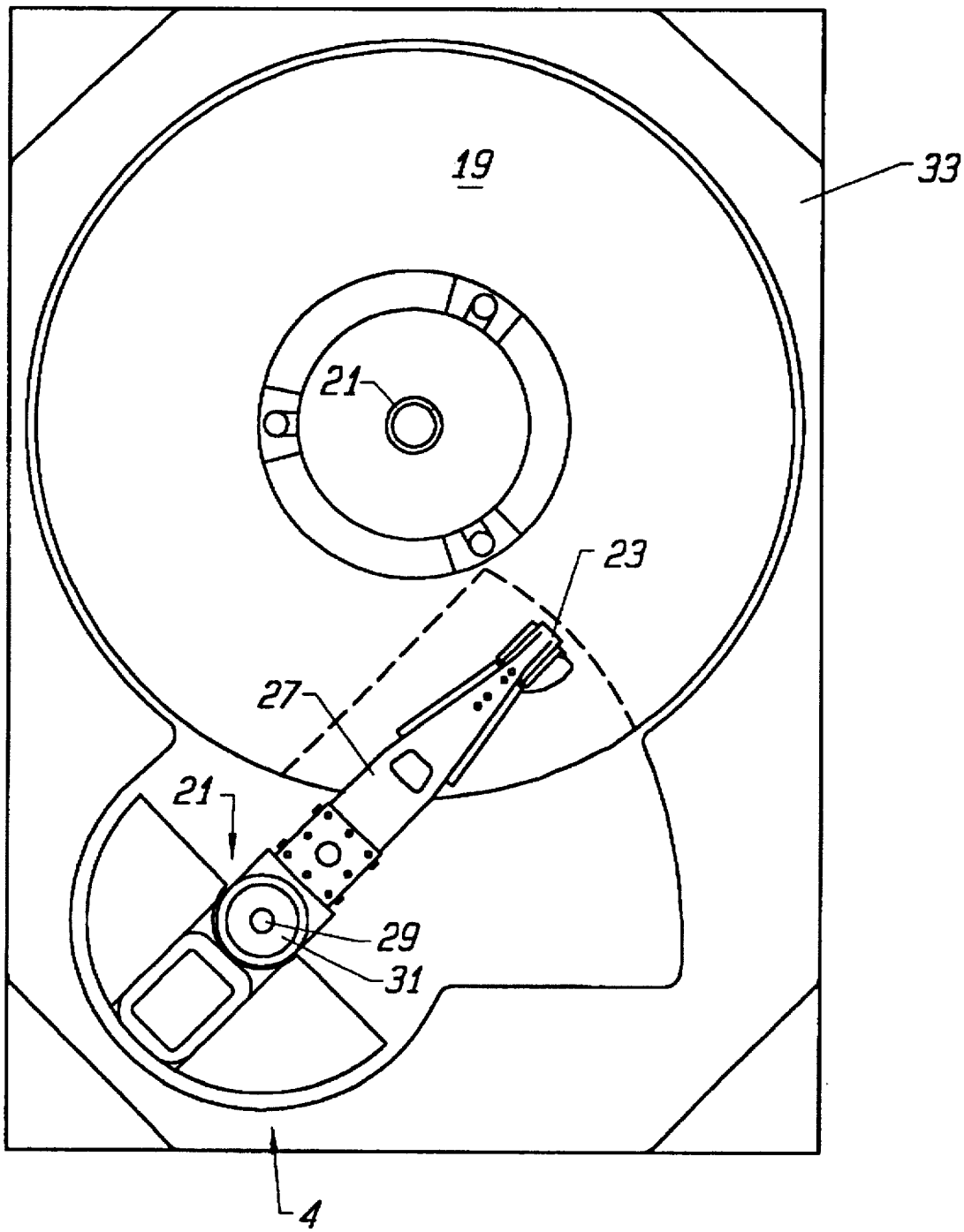
FIG. 6 is a top plan view of a disc drive in which the present invention is useful.

FIG. 6 is a plan view schematically illustrating an example of an actuator 21 incorporating the present invention usable to position a transducer 23 over a recording disc 19. Obviously, the actuator is usable in other fields although many of the features and advantages herein are especially adapted to rotating disc information storage systems especially those with limited space and wherein high performance in moving an actuator from track to track regardless of the location of the beginning and ending track. Clearly having the same torque available throughout the rotary arc defining the range of motion of the actuator is very desirable.

Figure 7A:
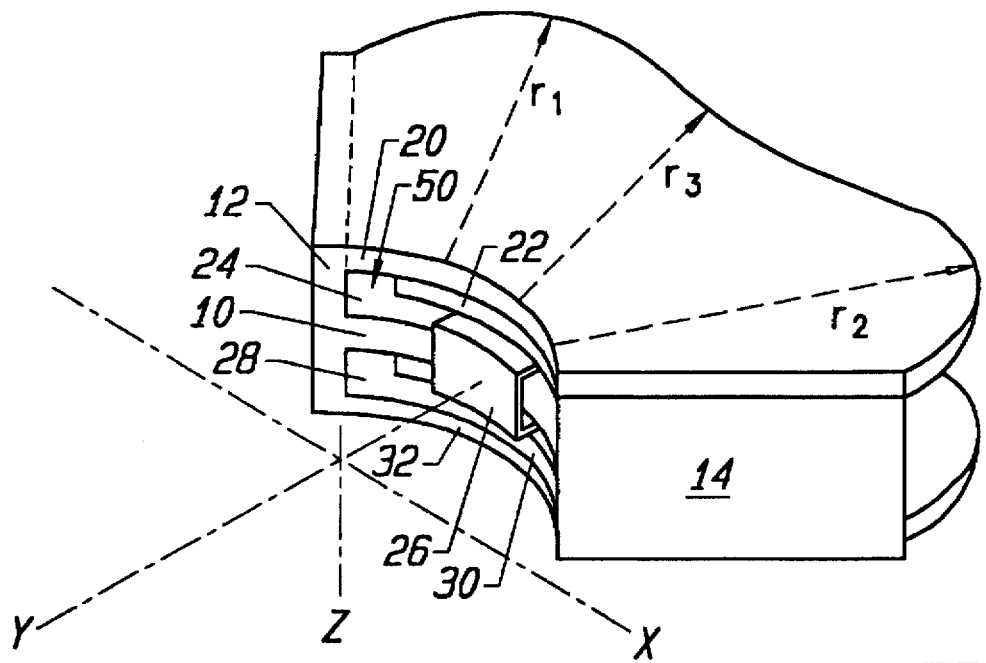
FIGS. 7A and 7C illustrate pole piece shape profiling in a voice coil motor design according to this invention.

Referring first to FIG. 7A, a preferred embodiment of the actuator assembly is depicted, where the portion of the actuator assembly which is relevant to this invention includes a center pole 10 held in place between upright pole pieces 12, 14, all three pieces being made of magnetically permeable material. The remainder of the actuator includes a top pole piece 20, a unipolar magnet 22, an air gap generally indicated at 24, a coil 26 which surrounds the center pole piece 10, a second air gap 28, a lower unipolar magnet 30, and lower pole piece 32.

The upper and lower magnets are preferably unipolar magnets, having like poles facing each other across the air gaps 24, 28. Energization of the coil 26 drives the coil and the armature (not shown in FIG. 7A) attached thereto from side to side over the center pole 10. The center pole 10 provides the important function of providing the flux return to the permanent magnet, allowing for a concentrated field and effective response to energization of the coil. The flux field is generally as shown in FIG. 7B. As can be seen in this figure, by forming the upper and lower poles 20, 32, and center pole 10 as well as side pole pieces 12 and 14 of magnetically permeable material the coil reaction flux which occurs upon energization of the coil 26 travels through the entire steel frame, thus forming an effective magnetic circuit which will position the coil 26 and thus the armature which is attached to the coil based on the interaction between the currents and the coil in the magnetic field.

The embodiment of FIG. 7A which includes profiles of the rear edge of the top and bottom yokes or pole pieces 20, 32, was adopted to optimize the flux path and accommodate the heavier flux which occurs in these top and bottom yokes near their juncture to the side pole pieces. As can be seen, the radius R1 and R2 of the top and bottom pole pieces increases gradually as the distance from the side yoke increases, so that the flux path through these pieces is not saturated, and the desirable increase in effective flux density interacting with the coil 26 is achieved. Referring back to FIG. 7B, it can be seen that the flux density tapers off as the center of the top and bottom yoke is neared so that the radius R1, R2 of each lateral portion of the yoke piece can gradually decrease reaching a minimum at or near the center of the top and bottom yoke, 20, 32. It is at this point that the flux is leaving the top and bottom yoke and passing through the unipolar magnets 22, 30, and through the coil 26 to return to the center yoke 10 and complete the magnetic circuit.

Figure 7C:
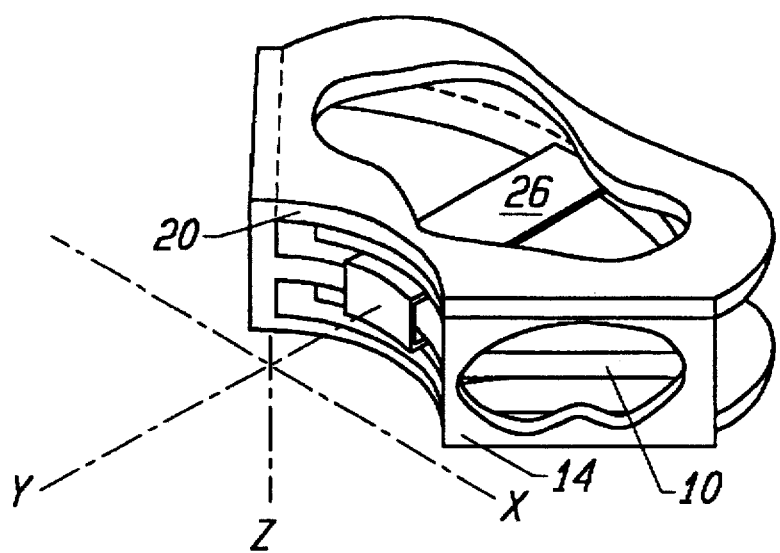
Figure 7B:
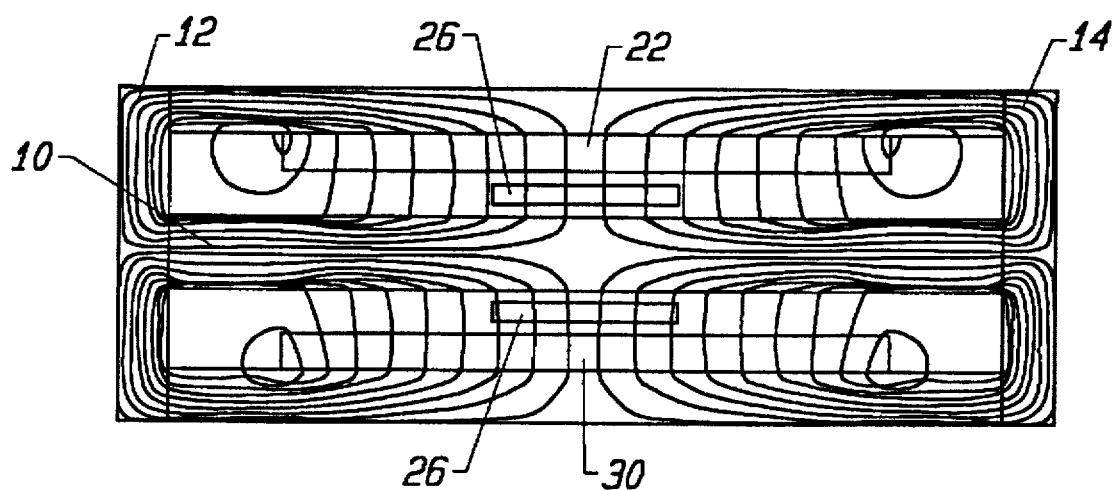
FIG. 7B is a flux profile for a voice coil motor with a rectangular yoke.

Looking next at FIG. 7C, the center portion of the top pole piece 20 and its underlying magnet 22 and the center portion of the side pole piece or back iron 14 are both cut away. This figure is intended to illustrate that while the top or bottom pole pieces are profiled to allow for passage of the flux to the profiled areas, the center pole piece typically is not profiled. The center pole piece 10 forms an arc or sector of a disc having a constant front to rear radius so that the coil 26 passes easily over the center pole and the side sections of the coil are always exposed to the full width of the back iron. This optimizes the interaction between the coil and the magnetic flux to provide the constant torque which has been identified as the primary objective of this invention.

Referring briefly back to FIG. 7A, it should also be noted that the unipolar magnets, 22, and 30 do not extend all the way to the side back iron pieces 12, 14. Rather, a gap 50 is left between each side of the unipolar magnet and the side back iron. The reason for this is two-fold. First, the magnets only need to be co-extensive with the desired stroke of the moving coil. Therefore, for example, where the stroke of the actuator and coil is to be about 25°, then the arc of the magnets only needs to be 25°, although the arc of the pole pieces will be greater.

Further, leaving the gap 50 between the side of the magnet and the side back iron reinforces that the flux will travel through the coil to the center pole piece 10, and then back up through the side piece and across through the top or back iron, rather than leaking directly from the side of the magnet to the side of the back iron, diminishing the torque established by the motor.

The magnets in this design are preferably unipolar magnets, that is, each of the two magnets 22, 30 has a single polarity for example N, facing the moving coil. Thus, the upper magnet is magnetized upwardly so that its' south pole is adjacent the upper yoke or upper pole piece 20 to which it is adhered, and the bottom magnet 30 has a south pole adjacent the lower yoke or pole piece 32. In this way, all of the flux travels out of the upper and lower pole pieces directly toward the center pole piece. These unipolar magnets are not like the conventional magnets used in voice coil motors where each surface has both a north and a south pole facing the coil and a transition zone in between.

Reviewing once again the effects of this shaping, by profiling the distance from the front edge to the back over the top and bottom pole pieces in the regions toward the side where the top back iron meets the side back irons, more cross-sectional area is provided for the flux to pass through. When the coil is aligned beneath that profiled portion of the back iron and the corresponding portion of the magnet, the flux in the air gap and thus the torque on the coil is substantially constant even though the coil is at or near the end of its travelling arc. It should further be noted that even at the narrowest point (here indicated by the radius R3) of the radius from the front of the back iron to the back of the back iron, each of the top and bottom back irons are still at least as long as or preferably slightly longer than the center pole so that the effective field from the back iron to the coil to the center back iron or pole is consistently optimized.

Figure 8A:
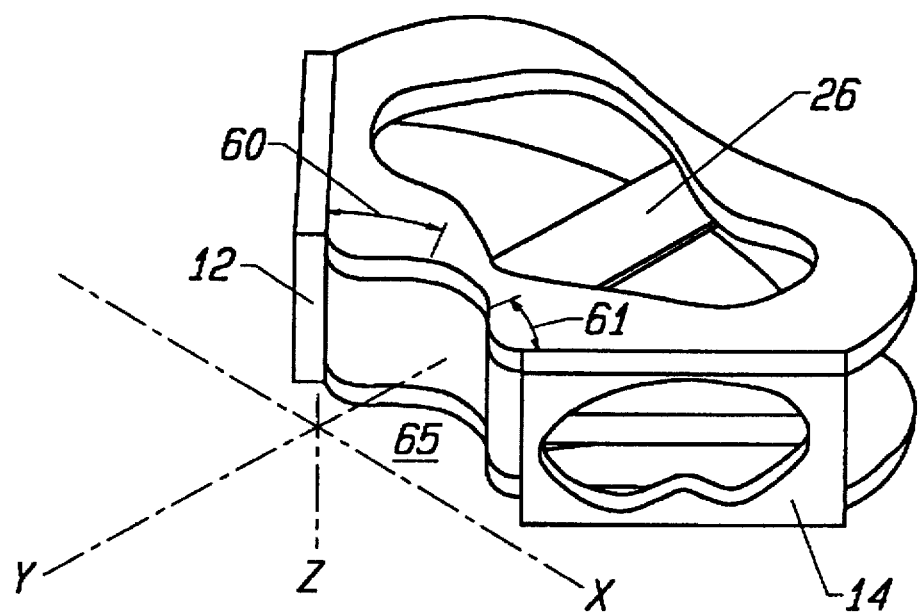
FIGS. 8A and 8B illustrate an alternative embodiment of the rectangular yoke of the present invention.
Figure 8B:
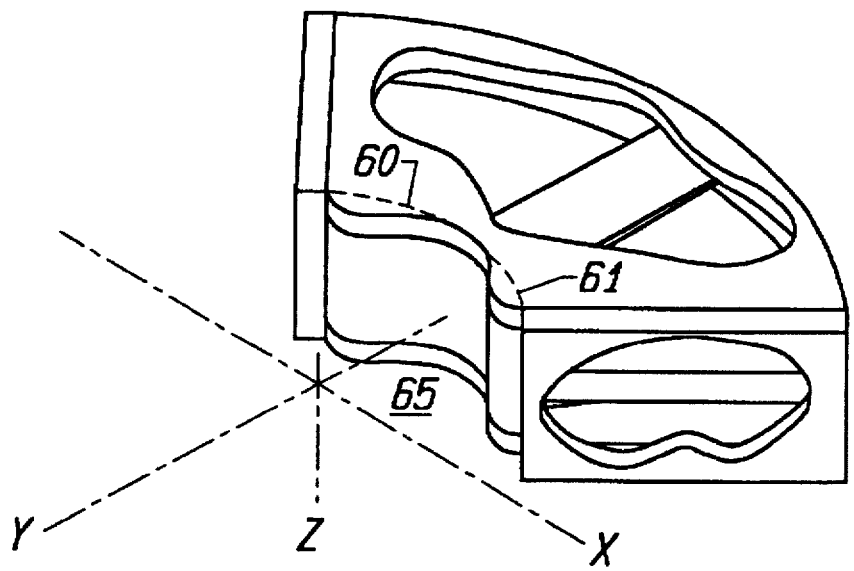

FIGS. 8A and 8B show the application of these concepts described above to profiling the inner radius of the yoke. Specifically, the design of FIGS. 8A and 8B are intended to be especially useful for positioning the actuator of a disc drive or the like. The bearing cartridge which supports the coil 26 on one side and an arm 27 (FIG. 6) pivoting over the surface of the disc on the opposite side has a relatively limited radius, especially in small disc drives where the arm and transducer are quite light in weight. Therefore, the same principles described above to reduce non-linearity in the flux density by lengthening the radius from the front to the back of the back iron arc can be implemented by extending the inner periphery of the upper and lower back iron radially inward. The most important regions 60 and 61 for enhancing the ability to handle the flux density are immediately adjacent the upright yoke pieces 12, 14 extending the periphery radially inward as shown in FIG. 8A while simultaneously extending the outer periphery in a profile as described with respect to FIG. 7A further enhances the armature's ability to provide a linear flux density across the gap when the coil is underlying the region 60, 61 at the side of the yoke. Since it is not important to have an extended radius for the yoke near the center of the arc of the coils path of travel, the region generally indicated at 65 is still readily available for placement of the bearing cartridge which will support the rotating arm.

Similarly, FIG. 8B shows the application of the principle solely to tailoring of the inner periphery 70 of the design for the yoke in the regions 60, 61, an approach which will be especially useful where there is insufficient space for extending the outer periphery because the yoke is to be placed adjacent the outer periphery of housing 33 (FIG. 6). In this case, while less cross-sectional area is created, some benefits are achieved in a very space efficient manner because of the fact that space will still be left for the bearing cartridge at the region 65 as illustrated therein.

Figure 9B:
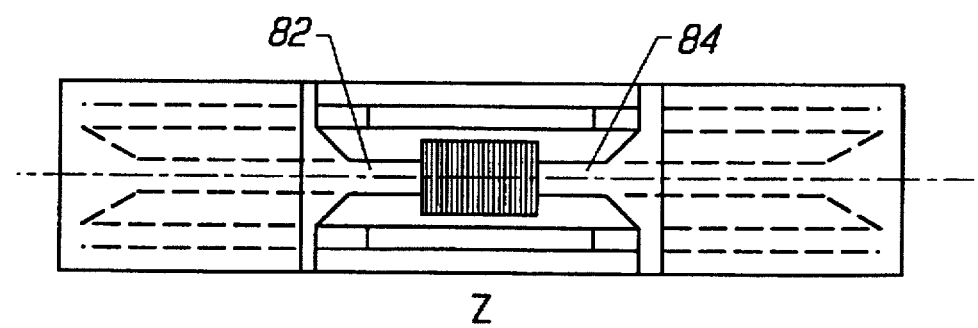
FIGS. 9A and 9B illustrate a further alternative embodiment of the present invention.
Figure 9A:
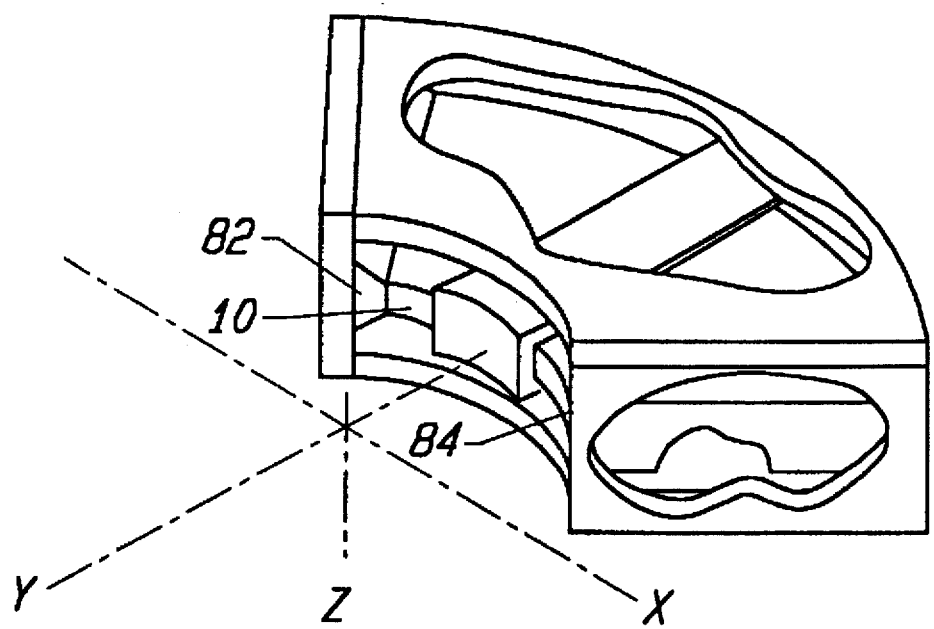

A further alternative to achieving the benefits of the present invention in minimizing the loss of flux density flowing through the system as shown in FIG. 9. The benefits of this embodiment can be better understood by briefly referring to FIG. 7B. Here it is shown that where the center pole 10 meets the side pole 12, 14, because sharp corners which are typically formed, the region for the flux to travel in is very restricted, and saturation accompanied by significant losses in the flux can occur, reducing the efficiency of the motor, especially in devices having small dimensions of the type disclosed herein. Therefore, by widening the ends of the center pole at the region 82, 84 shown in FIGS. 9A and 9B, the flux does not become saturated at the corner regions where the center pole meets the side back iron, and flux is not lost because of such saturation. In other words, the same amount of flux is now passing through a wider region, reducing the flux density, in an area where the poles are not interacting with the moving coil so that flux density is not significant. This prevents saturation and thus loss of the flux which is required to rapidly position the moving coil and thus the actuator arm. In FIGS. 9A and 9B, the inner and outer periphery of the upper and lower back irons are not shown as shaped to enhance the flux; however, such a combination of the embodiment of FIGS. 9A and 9B with the teachings of any of the above Figures is of course readily available depending on the overall height of the design and the cost available to be invested in the design.

A final alternative which needs to be considered with respect to the present design is the use of a shorted turn around a center pole pair. Specifically because of an increase in the size of the upper and lower back irons considerable inductance can be found to exist as the coil moves over the surface of the center pole. However, it has been found that even the use of a relatively narrow shorted turn comprising, for example, a thin piece of copper foil of a relatively narrow width comprising 0.2 mm millimeters relative to the pole 1.6 mm millimeter width of the center pole is sufficient to have a significant effect in reducing the inductance.

The following table is a comparison of the results of three designs where the "present design" is a design without any of the profiling of the center pole or the top and bottom poles as described in the embodiments above;

The "alternative without a shorted turn" is the alternative shown, for example, in FIGS. 7A and 7B where the top and bottom pole pieces are profiled to enhance the flux density interacting with the coil especially at the edges of the path of the travel of the coil; and the "alternative with shorted turn" is the same design alternative as in the adjacent column but with a shorted turn as described above in place over the center pole.

| COMPARISON OF DESIGNS | | | |
|---|---|---|---|
| | Present Design (normalized) | Alternative Without Shorted Turn | Alternative With Shorted Turn |
| Air gap flux density | 1 | 0.75 | 0.75 |
| Coil/Mid. yoke air gap distance | 1 | 1 | 0.75 |
| Coil # turn | 1 | 1.5 | 1.5 |
| Resistance | 1 | 0.8 | 0.8 |
| Inductance | 1 | 5.0 | 1.0 |
| Torque constant (Kt) | 1 | 1.1 | 1.1 |
| Torque linearity | 1 | 1.0 | 1.0 |
| Motor constant (Kt/√R) | 1 | 1.23 | 1.23 |
| Second moment of inertia | 1 | 0.75 | 0.75 |
| Access time @ same power | 1 | 0.92 | 0.82 |
| VCM longitudinal width | 1 | 0.65 | 0.65 |

As discussed at length above, the closed pole yoke described in the embodiments above utilizes unipolar magnets for enhanced effectiveness in avoiding saturation of the magnetic flux.

Figure 10A:
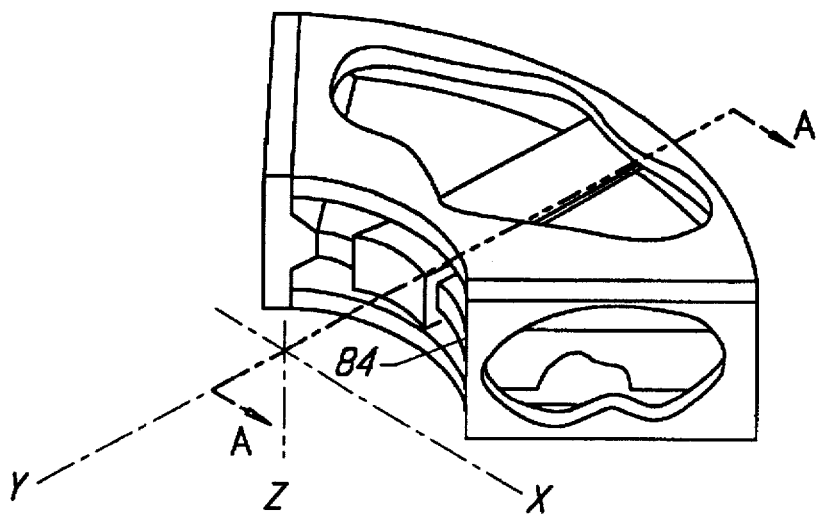
FIGS. 10A and 10B illustrate alternative approaches to shaping bipolar magnets and pole pieces utilizing the principles of the present invention.

An alternative approach would be to use profile poles/ magnet combinations which would be mounted either as shown in the embodiments of the preceeding figures such as FIG. 10A, or, alternatively, are mounted without the use of side back irons that are mounted according to conventional techniques as already known.

Figure 10B:
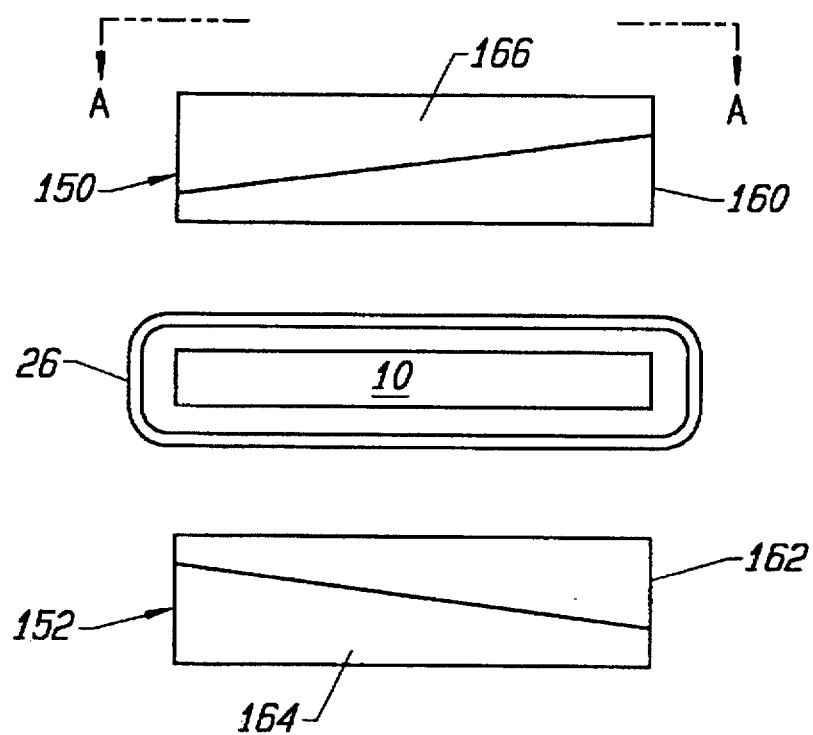

For example, the top and bottom pole magnet combinations 150, 152 of FIG. 10B could be mounted from the top and bottom of the housing. If they are mounted to cooperate with a center pole, of course, it would be appropriate to use the side irons to maintain the relative orientation of the pieces of the actuator.

Thus, turning to FIG. 10A it is shown having a section line A—A through the center to represent the placement of the center pole, the coil 26 which surrounds the coil, and the upper and lower magnet/back iron combinations. It should be noted that in this design, the magnets are of a conventional bipolar design with the magnets 160, 162 each having a north and south pole which are laterally separated, and a transition zone therebetween. Each of these magnets is backed up by a back iron 164, 166 of a magnetically permeable material. As can be seen, the shaping of the magnets and supporting back irons is perpendicular to the path of travel of the coil 26 which is essentially in and out of the page as it moves from side to side over the center pole 10. In this case, the flux is moving along a path which is also in and out of the page, and reaches a maximum above the magnets transition zone. This high flux density limits the performance of the actuator due to magnetic saturation if the magnets and their supporting pole pieces are too thin. Therefore, increasing the vertical thickness of the pole piece in the third dimension perpendicular to the direction of movement of the actuator coil is of significant benefit, with the greater height of the back iron being provided near the portion of the magnet and back iron closest to the center of rotation of the actuator arm which is carrying the coil 26 so that the flux can have its maximum interaction with the moving coil. This alteration providing the added thickness of the back iron avoids saturation. With appropriate selection of all the elements of the device, the torque and torque constant linearity will both be improved as a result of this modification.

An alternative approach where more vertical height is available relative to a coil moving through a horizontal gap is shown in FIG. 10A. The height of the magnets 100, 102 remains constant, while the back irons 106, 108 are shaped to increase the thickness of the back iron adjacent the transition region of the adjoining magnet. In this way, the travel of the flux is not impeded, and the effectiveness and linearity of the torque constant acting on the coil is significantly enhanced.

Other features and advantages of the present invention will become apparent to a person of skill in the art who studies the skill of the present invention disclosure which is to be limited only by the following claims.

What is claimed:

1. A voice coil motor comprising a yoke member including a center pole, an upper pole and a lower pole, and side pole members supporting said upper pole, center pole and lower pole;

first and second unipolar permanent magnets adhered to a lower surface of said upper pole and said upper surface of said lower pole, like poles of said unipolar magnets facing each other across air gaps defined between said center pole and said upper and lower poles;

a moving pole wound slidably around the center pole having a predetermined range of motion;

said upper and lower poles having radially extended portion in regions adjacent to where said upper and lower poles are supported on said side poles of said yoke member, whereby magnetic flux flowing through said side poles and into said upper and lower poles closes more easily through said upper and lower poles and maintains the flux density interacting with said coil across said air gaps, said center pole piece further having a constant radius from its inner to its outer periphery, said upper and lower pole pieces having said extended radial portions which extend radially beyond said center pole piece.

2. The voice coil motor as claimed in claim 1, wherein each of said unipolar magnets extend partially along the adhering surface of said upper and lower pole pieces, and terminate spaced by a gap from the supporting side pole pieces, whereby magnetic flux from said magnets is not lost to said side pole pieces.

3. A voice coil motor comprising a yoke member including a center pole, an upper pole and a lower pole, and side pole members supporting said upper pole, center pole and lower pole;

first and second unipolar permanent magnets adhered to a lower surface of said upper pole and said upper surface of said lower pole, like poles of said unipolar magnets facing each other across air gaps defined between said center pole and said upper and lower poles;

a moving pole wound slidably around the center pole having a predetermined range of motion;

said upper and lower poles having radially extended portion in regions adjacent to where said upper and lower poles are supported on said side poles of said yoke member, whereby magnetic flux flowing through said side poles and into said upper and lower poles closes more easily through said upper and lower poles and maintains the flux density interacting with said coil across said air gaps, said upper and lower pole pieces each having an outer periphery extending beyond the rear outer periphery of said central pole piece near the end of the range of motion of said moving coil, said outer periphery of said upper and lower poles tapering radially back toward the outer periphery of said center pole portion and reaching a minimum near the center of the range of motion of said moving coil.

4. A voice coil motor as claimed in claim 3 including a shorted turn wrapped around said center pole near the center of the range of motion of said moving coil.

5. A voice coil motor as claimed in claim 3 wherein an inner periphery of each of said upper and lower pole pieces extends radially inward toward the center of said radius in the regions adjacent said side poles, said radially extended regions tapering back toward the periphery of said center pole near the center of the range of motion of said moving coil.

6. A voice coil motor comprising a yoke member including a center pole, an upper pole and a lower pole, and side pole members supporting said upper pole, center pole and lower pole;

first and second unipolar permanent magnets adhered to a lower surface of said upper pole and said upper surface of said lower pole, like poles of said unipolar magnets facing each other across air gaps defined between said center pole and said upper and lower poles;

a moving pole wound slidably around the center pole having a predetermined range of motion;

said upper and lower poles having radially extended portion in regions adjacent to where said upper and lower poles are supported on said side poles of said yoke member, whereby magnetic flux flowing through said side poles and into said upper and lower poles closes more easily through said upper and lower poles and maintains the flux density interacting with said coil across said air gaps, said center pole having a substantially constant thickness in the region of the range of motion of said moving coil, and a gradually thicker region where said center pole joins said side poles, whereby flux saturation at the junction of said center pole and said side poles is avoided.

7. The voice coil motor as claimed in claim 6, wherein each of said unipolar magnets extend partially along the adhering surface of said upper and lower pole pieces, and terminate spaced by a gap from the supporting side pole pieces, whereby magnetic flux from said magnets is not lost to said side pole pieces.

8. A voice coil motor as claimed in claim 6 wherein said center pole piece has a constant radius from its inner to its outer periphery, said upper and lower pole pieces having said extended radial portions which extend radially beyond said center pole piece.

9. A voice coil motor as claimed in claim 6, wherein said upper and lower pole pieces each have an outer periphery extending beyond the rear outer periphery of said central pole piece near the end of the range of motion of said moving coil, said outer periphery tapering radially back toward the outer periphery of said center pole portion and reaching a minimum near the center of the range of motion of said moving coil.

10. A voice coil motor as claimed in claim 6 including a shorted turn wrapped around said center pole near the center of the range of motion of said moving coil.

11. A voice coil motor as claimed in claim 6 wherein an inner periphery of each of said upper and lower pole pieces extends radially inward toward the center of said radius in the regions adjacent said side poles, said radially extended regions tapering back toward the periphery of said center pole near the center of the range of motion of said moving coil.

12. A voice coil motor comprising a coil moving in a gap between upper and lower bipolar magnets under the influence of the interaction between the flux flowing through the magnets and a back iron supporting each of said magnets, wherein the improvement comprises said magnets being tapering in thickness in a dimension perpendicular to the path of travel of said trapezoidal coil, said magnets further being tapered from its greater thickness being near the radial outer edges of said magnet to a minimum thickness near a radial inner dimensional of said magnet, and said back iron is correspondingly thinner in the perpendicular direction at the radially outer dimension of said back iron and thicker near the radially inner dimension, so that the overall height of each of the magnet and pole combinations is substantially constant, but the ability of the pole to carry the flux and thereby avoid saturation is optimized.

13. A voice coil motor comprising a coil movable in a horizontal plane between upper and lower bipolar magnets, each of said bipolar magnets having a substantially constant thickness and including extending along their horizontal axis a south pole, a transition zone and a north pole, and supported by a pole piece adhered to the back length of the magnet along said horizontal axis and having a maximum thickness perpendicular to said horizontal axis overlying said transition zone and varying radially along said coil from the inner end to the outer end of said coil, so that the ability of said pole piece to carry the flux created by said magnets and interacting with said pole without saturation is optimized.

* * * * *